United States Patent
Taylor et al.

(10) Patent No.: US 6,244,034 B1
(45) Date of Patent: Jun. 12, 2001

(54) COMPRESSOR BLEED PRESSURE STORAGE FOR CONTROLLED FUEL NOZZLE PURGING OF A TURBINE POWER GENERATING SYSTEM

(75) Inventors: Colin Taylor, Lakewood, CA (US); Patrick Lee O'Brien, Albuquerque, NM (US)

(73) Assignee: AlliedSignal, Inc., Morristown, NJ (US)

(*) Notice: Subject to any disclaimer, the term of this patent is extended or adjusted under 35 U.S.C. 154(b) by 0 days.

(21) Appl. No.: 09/399,441

(22) Filed: Sep. 17, 1999

Related U.S. Application Data

(63) Continuation-in-part of application No. 08/995,459, filed on Dec. 20, 1997, now abandoned.

(51) Int. Cl.[7] .................. F02C 6/16; F02C 7/10; F02C 7/22
(52) U.S. Cl. .................. 60/39.02; 60/39.094; 60/39.511
(58) Field of Search .................. 60/39.511, 39.27, 60/39.094, 723, 39.02

(56) References Cited

U.S. PATENT DOCUMENTS

| | | | |
|---|---|---|---|
| 3,344,602 | * 10/1967 | Davies et al. | 60/39.094 |
| 4,032,091 | * 6/1977 | Reddy | 60/39.094 |
| 4,041,695 | * 8/1977 | Harper et al. | 60/39.094 |
| 4,754,607 | * 7/1988 | Mackay | 60/723 |
| 4,984,424 | * 1/1991 | Shekleton | 60/39.094 |
| 5,024,055 | * 6/1991 | Sato et al. | 60/39.27 |
| 5,129,222 | * 7/1992 | Lampe et al. | 60/39.27 |
| 5,324,175 | * 6/1994 | Sorensen et al. | 417/254 |
| 5,992,139 | * 11/1999 | Kesseli | 60/39.183 |
| 6,125,624 | * 10/2000 | Prociw | 60/39.094 |

FOREIGN PATENT DOCUMENTS

| | | | |
|---|---|---|---|
| 3916477 | * 11/1990 | (DE) | 60/39.094 |
| 0472294 | 2/1992 | (EP) . | |
| 60-164627 | * 8/1985 | (JP) | 60/39.094 |

* cited by examiner

*Primary Examiner*—Ted Kim
(74) *Attorney, Agent, or Firm*—Jack Rafter; Ephraim Starr; Mike Morgan

(57) ABSTRACT

A microturbine power generating system includes a reservoir that is pressurized with compressor air during system operation. The pressurized air in the reservoir is used to purge combustor fuel nozzles of residue after combustion in the combustor has ceased.

14 Claims, 2 Drawing Sheets

COMPRESSOR BLEED PRESSURE STORAGE FOR CONTROLLED FUEL NOZZLE PURGING OF A TURBINE POWER GENERATING SYSTEM

CROSS REFERENCE TO RELATED INVENTIONS

This application is a continuation-in-part, and claims the benefit of the filing date, of co-pending non-provisional application Ser. No. 08/995,459, filed on Dec. 20, 1997, now abn. The present application is commonly assigned with the earlier application and has common inventorship with the earlier application.

BACKGROUND OF THE INVENTION

The present invention relates generally to turbine power generating systems. More specifically, the present invention relates to a method and apparatus for purging fuel injector nozzles after combustion in the turbine combustor has ceased.

The United Sates Electric Power Research Institute (EPRI) which is the uniform research facility for domestic electric utilities, predicts that up to 40% of all new generation could be provided by distributed generators by the year 2006. In many parts of the world, the lack of electric infrastructure (transmission and distribution lines) will greatly expedite the commercialization of distributed generation technologies since central plants not only cost more per kilowatt, but also must have expensive infrastructure installed to deliver the product to the consumer.

Small multi-fuel, modular distributed microturbine generation units could help alleviate current afternoon "brownouts" and "blackouts" prevalent in many parts of the world. A simple, single moving part concept would allow for low technical skill maintenance and low overall cost would allow for widespread purchase in those parts of the world where capital is sparse. In addition, given the Unites States emphasis on electric deregulation and the world trend in this direction, consumers of electricity would have not only the right to choose the correct method of electric service, but also a new cost effective choice from which to choose. U.S. Pat. No. 4,754,607, which is assigned to the assignee of the present invention, discloses a microturbine power generating system suitable for cogeneration applications.

Liquid fuel units include a combustor and one or more fuel injector nozzles disposed within or leading into the combustion space of the combustor. Each nozzle has small orifices that cause the desired atomization of fuel upon injection into the combustor. Though these orifices are exposed to substantial heat during operation, fuel flowing through the nozzles provides cooling that prevents undesirable overheating of the nozzles. However, when operation of the unit is shut down the fuel no longer flows through the nozzles, which are exposed to residual combustor heat. If residual fuel is left in the nozzles, coking will occur. Being carbonaceous in nature, the residual fuel will undergo a destructive distillation reaction and form a coke-like or tarry residue on the nozzles. This residue will clog the nozzles and result in improper operation on subsequent startups.

The use of a stored volume of compressed air to purge fuel supply lines and/or nozzles is known. Offenlegungsschrift DE 3916477 discloses a compressor connected to a compressed air storage vessel. The vessel is also connected to the fuel supply line via a non-return valve. When the turbine is shut down by closing the fuel supply valve, pressure in the fuel supply line automatically falls permitting compressed air in the storage tank to automatically enter the fuel supply line and into the fuel injection nozzle so that any residual fuel in the fuel supply line or nozzle is blown into the combustion chamber and out through the turbine.

U.S. Pat. No. 4,041,695 to Harper et al., discloses a pneumatic purge system for gas turbine engines which includes an accumulator 82 for storing pressurized air at the maximum pressure developed by the compressor. In addition to the pressure accumulator tank, the purge system includes one-way check valves 80 and 90, and a solenoid shutoff valve 92. During normal engine operation the shutoff valve is in the closed position and the fuel valve 36 in the open position. Upon initiation of shutdown, the speed of the engine is first reduced to 60 to 70 percent of its maximum or optimum speed. Control 94 is then operated to close the solenoid fuel valve and simultaneously (or substantially simultaneously) open solenoid control valve 92. The resulting release of air purges all the remaining fuel from the fuel delivery system and into the combustion chamber of the engine while the combustion process is continuing. In this manner substantially all the fuel purged from the system is consumed in the combustion process, reducing emission of unburned hydrocarbons into the atmosphere. Continued air flow, after completion of the combustion process, blows off any residual traces of fuel off the spray nozzles which substantially eliminates carbon formation on such nozzles.

Though, at col. 3, ll. 57–59, Harper et al., indicates that engine 10 can be utilized as "an aircraft powering unit, auxiliary power unit or a stationary or other ground installation," the purging system is clearly designed for aircraft turbine engines. See, for instance, the drawing, col. 2, ll. 46–49 and col. 4, ll. 15–17. Further, while the system of Harper, et al. has the advantage of purging the fuel delivery system and substantially eliminating carbon deposits from the fuel nozzles, the process results in "a slight increase in the combustion process and in a slight, momentary acceleration of the engine." See col. 5, ll. 3–6. This may be acceptable when there is a controlled shutdown (i.e., the engine speed has already been reduced to between 60 to 70 percent of its maximum or optimum speed). However, a shutdown at maximum speed will result in an overspeed condition which may be excessive or otherwise undesirable. Overspeed by itself may result in mechanical failure of the rotating components. Also, immediate rapid shutdown at maximum speed may be required when an abnormal operating condition, such as a bearing or rotor failure is sensed, to prevent or minimize damage to turbine, compressor, generator or other system components.

Accordingly, it is an object of the present invention to shut down an engine without any increase in acceleration of the turbine (and, for that matter, any mechanically coupled components such as a compressor and a generator) and prevent carbon build up on the fuel injector nozzles.

It is a further object of the present invention to provide a purge system with a controller and associated sensors, in which the controller: (1) cuts off the flow of fuel to the combustor to cause deceleration of the turbine; and (2) only after combustion has ceased, causes the release of purging air to blow residual fuel off the fuel injection nozzles to minimize carbon buildup.

SUMMARY

In combination with a gas turbine engine having a combustor with one or more fuel injector nozzles, a compressor for compressing gas to an elevated pressure, and a compressor discharge conduit delivering pressurized gas (preferably, air) to said combustor: (1) a fuel delivery system including a source of pressurized fuel, (b) a control valve for interrlipting fuel flow to the combustor, (c) a gas accumulator operably connected to the compressor discharge conduit for accumulating and storing gas, (d) a conduit means for providing communication between the accumulator and the fuel injector nozzles; (e) a control valve operably disposed in the conduit for selectively allowing and blocking gas flow from the accumulator to the fuel nozzles; (f) apparatus for determining when combustion in the combustor has ceased; and (g) a controller for opening said control valve. The apparatus for determining when combustion has ceased may include a temperature sensor, a timer or an algorithm. The combustor may include a catalyst capable of combusting fuel-air mixtures in a specified temperature range. The turbine may include a recuperator.

The method of purging fuel from one or more fuel injector nozzles in the combustor of a gas turbine engine with a gas (air) compressor during shutdown includes the steps of: (a) bleeding air from the discharge of the compressor during operation of the turbine; (b) storing the bleed air in the accumulator; (c) interrupting the flow of fuel being delivered to the combustor; (d) determining when the combustion in the combustor has ceased; and (e) communicating the accumulator with the fuel injector nozzles after the combustion in the combustion chamber has ceased, to enable said stored air to purge residual fuel from said fuel injector nozzles.

DETAILED DESCRIPTION OF THE INVENTION

Figure 1:
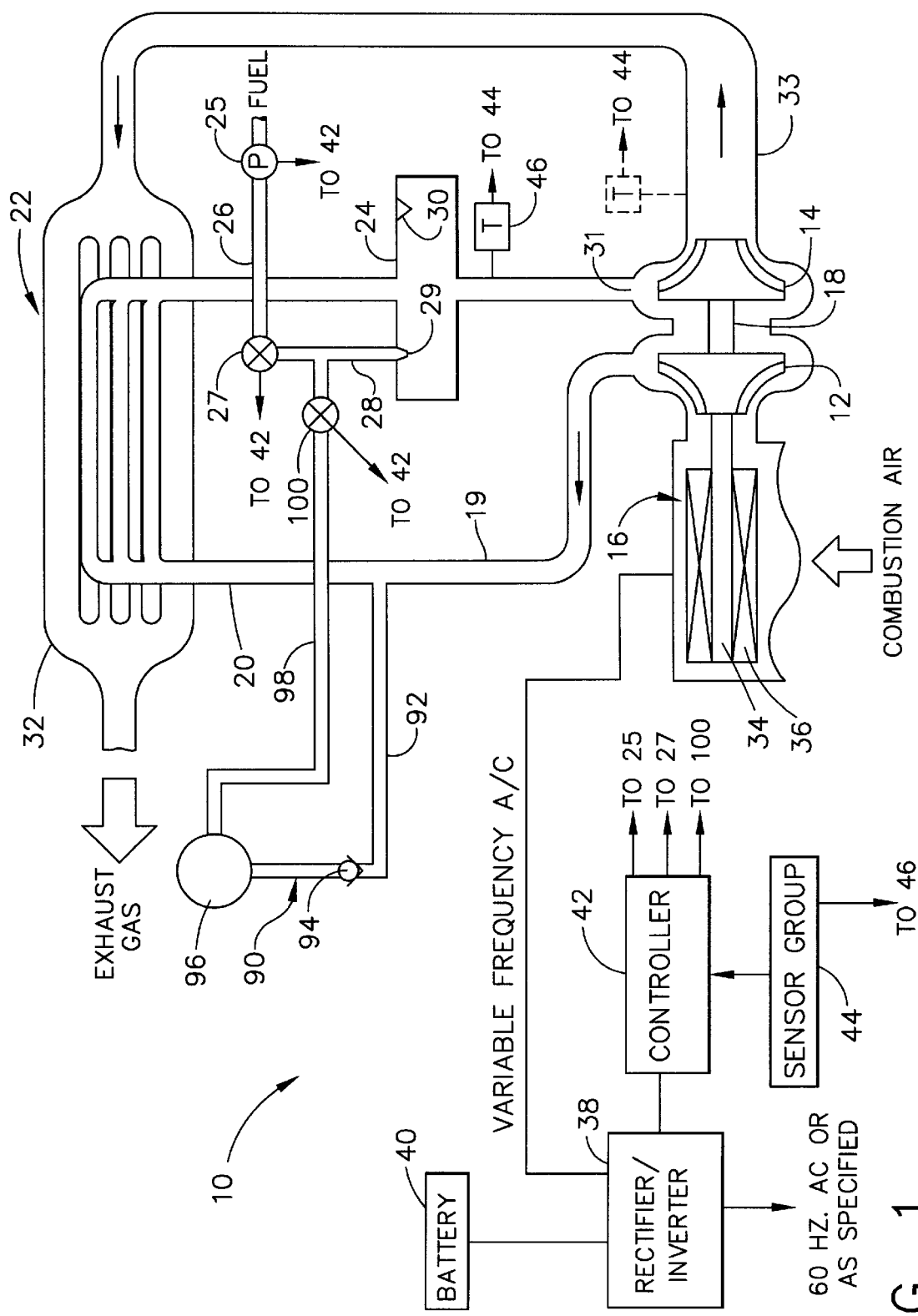
FIG. 1 is a block diagram of a power generating system according to the present invention.

Referring to FIG. 1, a power generating system 10 incorporating the present invention is illustrated. The power generating system 10 includes a compressor 12, a turbine 14 and an electrical generator 16. The electrical generator 16 is cantilevered from the compressor 12. The compressor 12, the turbine 14 and the electrical generator 16 can be rotated by a single shaft generally designated 18. Although the compressor 12, turbine 14 and electrical generator 16 can be mounted to separate shafts, the use of a single common shaft 18 for rotating the compressor 12, the turbine 14 and the electrical generator 16 adds to the compactness and reliability of the power generating system 10.

Air entering the inlet of the compressor 12 is compressed. Compressed air leaving outlet 19 of the compressor 12 is circulated through cold side passages 20 of recuperator 22. In the recuperator 22, the compressed air absorbs heat, which enhances combustion. The heated, compressed air leaving the cold side of the recuperator 22 is supplied to combustor 24.

Fuel (e.g., diesel) is supplied to the combustor 24 from a suitable source (not shown) by pump 25. Pump 25 delivers pressurized fuel through conduit 26, across a flow control valve 27 and conduit 28, to injection nozzle 29. Nozzle 29, which can be purchased from sources such as Parker-Hanifin or Delevan, is provided with a plurality of tiny openings (e.g., 0.01" in diameter) which atomize the fuel as it is sprayed into combustor 24. In addition to mechanical spray nozzles such as simplex or air-assist nozzles, any suitable atomizing device can be used. More complex atomizing devices that could be used include, for example, electrostatic and ultrasonic nozzles.

Inside the combustor 24 the fuel and compressed air are mixed and ignited by an igniter 30 in an exothermic reaction. In a preferred embodiment, the combustor 24 contains a suitable catalyst capable of combusting the compressed, high temperature, fuel-air mixture at the process conditions. Some known catalysts usable in the combustor 24 include platinum, palladium, as well as metal oxide catalysts with active nickel and cobalt elements.

After combustion, the hot, expanding gases are directed to an inlet nozzle 31 of the turbine 14. The inlet nozzle 31 has a fixed geometry. The hot, expanding gases resulting from the combustion are expanded through the turbine 14, thereby creating turbine power. The turbine power, in turn, drives the compressor 12 and the electrical generator 16.

Turbine exhaust gas is circulated by hot side passages 32 of the recuperator 22. Inside the recuperator 22, heat from the turbine exhaust gas on the hot side is transferred on the cold side. In this manner, some heat of combustion is recuperated and used to raise the temperature of the compressed air en route to the combustor 24. After surrendering part of its heat, the gas exists the recuperator 22. Additional heat recovery stages could be added onto the power generating system 10.

The generator 16 can be a ring-wound, two-pole toothless (TPTL) brushless permanent magnet electric machine having a permanent magnet rotor 34 and stator windings 36. The turbine power generated by the rotating turbine 14 is used to rotate the rotor 34. The rotor 34 is attached to the shaft 18. When the rotor 34 is rotated by the turbine power, an alternating current is induced in the stator windings 36. The speed of the turbine 14 can be varied in accordance with external energy demands placed on the system 10. Variations in the shaft speed will produce a variation in the frequency (i.e., wild frequencies) of the alternating current generated by the electrical generator 16. Regardless of the frequency of the ac power generated by the electrical generator 16, the ac power can be rectified to dc power and then inverted by a rectifier/inverter 38 to produce ac power having the desired fixed frequency. Accordingly, when less power is required, the turbine speed can be reduced without affecting the frequency of the ac output.

Use of the rectifier/inverter 38 allows for wide flexibility in determining the electric utility service to be provided by the power generating system of the present invention. Because any rectifier/inverter 38 can be selected, frequency of the ac power can be selected by the consumer. If there is a direct use for ac power at wild frequencies, the rectifier/inverter 38 can be eliminated.

The power generating system 10 can also include a battery 40 for providing additional storage and backup power. When used in combination with rectifier/inverter 38, the combination can provide uninterruptible power for hours after generator failure.

During operation of the power generating system 10, heat is generated in the electrical generator 16 due to inefficiencies in generator design. In order to extend the life of the electrical generator 16, as well as to capture useful heat, compressor inlet air flows over the generator 16 and absorbs excess heat from the generator 16. The rectifier/inverter 38 can also be placed in the air stream. After the air has absorbed heat from the aforementioned sources, it is compressed in the compressor 12 and, as discussed above, further pre-heated in the recuperator 22.

A controller 42 controls the turbine speed by controlling the amount of fuel flowing to the combustor 24. The controller 42 uses sensor signals generated by a sensor group 44 to determine the external demands upon the power generating system 10. The sensor group 44 includes, at a minimum, temperature sensor 46 which monitors the temperature in combustor 24. Ideally, the sensor is positioned adjacent to combustor 24 (as illustrated). However, due to the high temperature in the area of combustor 24 and turbine inlet 31, it may well be located adjacent turbine exhaust 33 (as indicated in phantom lines). Typically, sensor group 44 will also include sensors such as position sensors, shaft speed sensors, and various other temperature sensors and pressure sensors for measuring operating temperatures and pressures in the system 10. Using the aforementioned sensor, the controller 42 controls both startup and optimal performance during steady state operation. The controller 42 can also determine the state of direct current storage in the battery 40 and adjust operations to maintain conditions of net charge and net drain on the battery.

A switch/starter control (not shown) can be provided offskid to start the power generating system 10. Rotation of the compressor 12 can be started by using the generator 16 as a motor. During startup, the switch/starter control supplies an excitation current to the stator windings 36 of the electrical generator 16. Startup power is supplied by the battery 40.

Power generating system 10 also includes a purge system 90, including conduit 92, one way check valve 94, air reservoir or accumulator 96, conduit 98 and solenoid controlled purge valve 100 (which is controlled by controller 42). During operation of the system 10, air pressurized by the compressor 12 also flows through conduit 92, one-way valve 94 and into air reservoir 96. When the system 10 starts up, the pressure in reservoir 96 is low, lower than the compressor discharge pressure. As the air flows into the reservoir 96, the reservoir 96 becomes pressurized. Purge valve 100 is closed to prevent pressurized air from flowing out of the system 90 and into fuel conduit 28. The check valve 94 also prevents flow of air out of the reservoir 96. The reservoir 96 eventually becomes charged to the discharge pressure of compressor 12.

During system shutdown, both normal and in an emergency, controller 42 actuates control valve 27 to interrupt fuel flow from pump 25 which is also simultaneously, or substantially, turned off. With the flow of fuel discontinued, combustion in combustor 24 ceases and the temperature in the combustor 24, turbine inlet 31, and turbine exhaust 33 drops. When the temperature drop, as indicated by sensor 46, reaches a predetermined value, controller 42 opens purge valve 100. This, in turn, releases the pressure in accumulator 96 and conduit 98, which is forced through nozzle 29, thereby purging any residual fuel. This purging substantially eliminates the build-up of carbon on the nozzle orifices which would otherwise occur because of the elevated temperature on combustor 24 even after shut down. Use of sensor 46 as part of the purging process is not necessary. Purge valve 100 can also be opened, via controller 42, after a predetermined time delay (after control valve 27 has been activated). A timer or control algorithm can be incorporated into controller 42 for this purpose.

To avoid any turbine acceleration it is important that combustion in combustor 24 cease prior to the purging of nozzle 29. This is important both during normal shutdown, when the turbine may be at or near its maximum operation speed (which is desirable from the standpoint of operating efficiently) and during any emergency shutdown. Overspeed may result in mechanical failure of the rotating components of the system 10, or may result in additional damage where the shutdown is necessitated by, for instance, a bearing or rotor failure.

The predetermined value of the temperature drop—or, in the alternative embodiment of the purging process, the predetermined time delay—depends upon whether combustor 24 includes catalyst elements. If no catalyst elements are present, the predetermined value or delay is chosen such that the combustion process has ceased and cannot be restarted simply by the injection of additional fuel in the combustor. If, on the other hand, combustor 24 contains catalyst elements, the temperature drop or time delay is preferably longer in order to allow the turbine speed to decrease to the point at which overspeeding would not present a problem when the purged, residual fuel combusts in the catalyst, as the residual fuel is likely to do even at temperatures that are significantly lower than normal operating temperatures of combustor 24.

Figure 2:
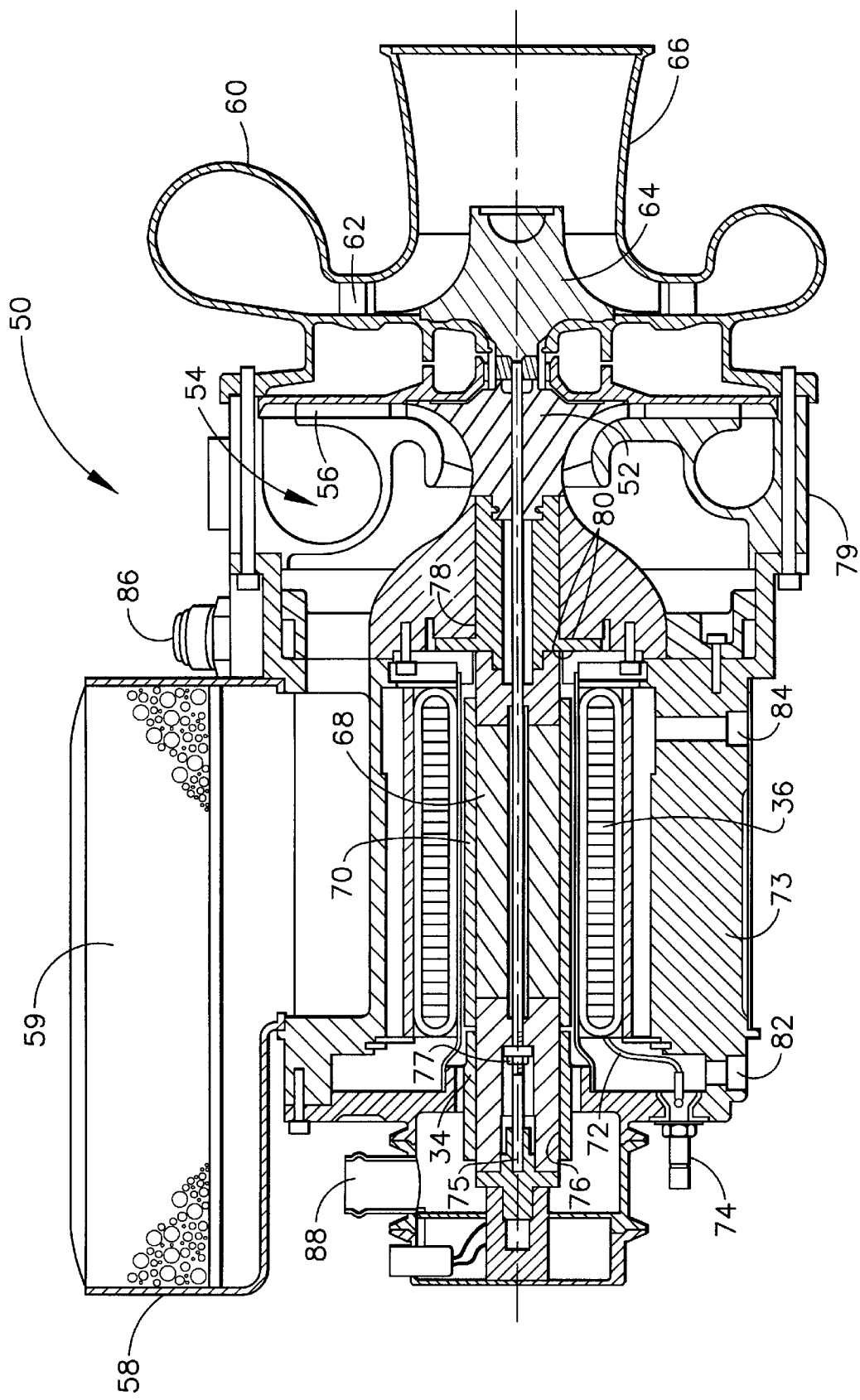
FIG. 2 is a cross-section view of an engine core for the power generating system.

Referring to FIG. 2, the "engine core" 50 of the power generating system 10 is shown. The compressor section of the engine core, depicted in the block diagram of FIG. 1 as compressor 12, includes an impeller 52 having a bore, a compressor scroll 54 and a diffuser channel 56. Air entering an air inlet 58 is filtered by an air filter 59 and directed to the compressor scroll 54. Air flowing out of the compressor scroll 54 is directed to the recuperator 22.

The turbine section of the engine core, depicted in the block diagram of FIG. 1 as turbine 14, includes a turbine scroll 60, a plurality of fixed nozzle vanes 62, and a boreless turbine wheel 64. Hot expanding gases leaving the combustor 24 are directed into the turbine scroll 60 and through the nozzle vanes 62, which redirect the hot expanding gas onto the turbine wheel 64. Turbine exhaust gas leaves the turbine 14 through an exhaust diffuser 66, which reduces the temperature and noise of the turbine exhaust gas.

The rotor 34 of the electrical generator 16 includes magnets 68 made of a rare earth material such as samarium cobalt. The magnets 68 are surrounded by a containment sleeve 70 made of a non-magnetic material such as Inconel 718. The stator windings 36 are housed in a generator housing 73. The rotor 34 has a bore and an optional containment sleeve (not shown). Power conductors 72 extend from the stator windings 36 and terminate in a power connector stud 74. The base 79 provides support for a fuel inlet, the air inlet 58, the compressor 12, the turbine 14, the generator 16, the recuperator 22, the combustor 24, and the rectifier/inverter 38, to enable the system 10 to exist as a packaged unit.

The single shaft, generally designated as 18 in FIG. 1, includes a tieshaft 75, which extends through the bores in the rotor 34 and the compressor impeller 52. The tieshaft 75 is thin, having a diameter of approximately 0.25 inches to 0.5 inches. The bores have clearances that allow the tieshaft 75 to extend through the rotor 34 and the impeller 52. However, the tieshaft 75 does not extend through the turbine wheel 64. Instead, the tieshaft 75 is secured to the turbine wheel 64. The tieshaft 75 can be secured to the center of the turbine wheel hub by an inertia weld. Thus, the turbine wheel 64 is boreless in that it does not have a bore through which the tieshaft 75 extends. Eliminating the bore reduces stresses in the turbine wheel 64.

When clamped together with tieshaft 75, the compressor impeller 52, the turbine wheel 64 and the rotor 34 are rotated as a single unit. Under high operating temperatures and rotational speeds, however, the impeller 52, the turbine wheel 64 and the rotor 34 tend to expand and grow apart and their faces tend to lose contact. Flexing of the tieshaft 75 during operation also tends to separate the faces. To maintain contact between the faces of the impeller 52, the turbine wheel 64 and the rotor at high rotational speeds (65,000 rpm and above), the tieshaft 75 is preloaded. For example, a tieshaft 75 made of Inconel 718 can be preloaded in tension to about 90% of yield of strength. During assembly, the tieshaft 75 is preloaded, the impeller 52 and the rotor 34 are slid over the tieshaft 75, and a nut 77 is secured to a threaded end of the tieshaft 75. The tension in the tieshaft 75 is maintained as the nut 77 is turned.

The rotating unit 52, 64, 34 and 75 is supported in a radial direction by inboard and outboard foil journal bearings 76 and 78. The rotating unit 52, 64, 34 and 75 is supported in an axial direction by a foil thrust bearing 80. The foil bearings eliminate the need for a separate bearing lubrication system and reduce the occurrence of maintenance servicing.

Various coolant ports are provided for the engine core 50. Provided are ports 82 and 84 for circulating a coolant over the stator windings 36. Also provided are ports 86 and 88 for circulating a coolant over the foil bearings 76, 78 and 80.

The power generating system 10 can be built in several major modules such as a rotating module, a heat exchanger module, a combustor module, and an electronics module. Each of these modules is relatively lightweight and compact. The modules can be replaced without breaking liquid lines. The use of foil bearings 76, 78 and 80 eliminates the need for an oil-based lubrication system and, therefore, results in low maintenance of the power generating system 10. Scheduled maintenance would consist primarily of replacing the igniter 30, the filter 59 and catalyst elements in the combustor 24.

The power generating system 10 operates on a conventional recuperated Brayton cycle. The Brayton cycle can be operated on a relatively low pressure ratio (e.g., 3.8) to maximize overall efficiency, since, in recuperated cycles, the lower the pressure ratio, the closer the turbine exhaust temperature is to the inlet temperature. This allows heat addition to the cycle at high temperature and, in accordance with the law of Carnot, reduces the entropic losses associated with supplying heat to the cycle. This high temperature heat addition results in an increased overall cycle efficiency.

The values that follow are provided merely as an example. Air is compressed in a single stage radial compressor to 3.8 bars. The compressed air can be directed to the recuperator 22 where the temperature of the compressed air is increased using the waste heat of the turbine exhaust gas. The temperature of the exhaust gas from the turbine 14 is limited to about 1,300° F. in order to help extend the life of the recuperator 22. For exhaust gas temperatures above 1300° F., the recuperator 22 can be made of super alloys instead of stainless steel. The recuperator 22 can be designed for either 85% or 90% effectiveness depending on the economic needs of the customer. In the most efficient configuration, and using the 90% recuperation, the overall net cycle efficiency is 30%, yielding a high heating value heat rate of approximately 11,900 BTU/kWh on diesel.

After being heated in the recuperator 22, the compressed air is directed to the combustor 24, where additional heat is added to raise the temperature of the compressed air to 1,650° F. A combustor 24 designed according to a conventional design can yield a NOx level of less than 25 ppm, and a combustor 24 using a catalyst can yield a NOx rate that is virtually undetectable (commercial NOx sensors are limited to a 2 to 3 ppm detection range). The high enthalpic gas is then expanded through the turbine 14. The impeller 52, the turbine wheel 64, the rotor 34, and the tieshaft 75—the only moving parts in the engine core 50—spin as a unit at speeds of approximately 65,000 rpm or more. The resulting high frequency generator output of around 1,200 hertz is then reduced by the inverter 38 to a grid-compatible 50 or 60 cycles. Resulting is a high power density typified by low weight (about a third of the size of a comparable diesel generator) and a small footprint (for example, approximately 3 feet wide by 5 feet long by 6 feet high).

The high power density and low weight of the technology is made possible through the high speed components, which permit large amounts of power using a minimum of material. The unit may be completely self-contained in a weather proof enclosure. The power generating system 10 is "plug and play," requiring little more than a supply of clean fuel.

Thus disclosed is a system 10 in which the nozzle 29 is purged, essentially independent of compressor discharge pressure. The nozzle 29 is cleaned of substantially all residue that would otherwise cause clogging and lead to improper operation on subsequent startups of the system 10.

The power generating system 10 has a low thermal signature and minimal noise generation. The use of air bearings eliminates the need for an oil-based lubrication system. The electrical generation system 10 has high reliability and minimal service requirements due to single moving part design. The use of a solid-state electronic inverter/rectifier 38 allows the system 10 to provide a variable ac output. Installation is easy due to a modular and self contained design, and servicing is easy because the core 50 has one moving unit and major parts that are easily accessible. The width, length and height of the engine core 50 can be adjusted to fit a wide variety of dimensional requirements.

The power generating system 10 is smaller, lighter, more fuel-efficient and has lower thermal signature, noise maintenance and cost penalties than comparable internal combustion engines. Therefore, due to its low installation costs, high efficiency, high reliability and simple, low cost maintenance, the power generating system 10 provides lower operating and fixed costs than power generators of comparable size.

Potential applications for the power generating system 10 are many and diverse. Applications include use in off-grid applications for standalone power, on-grid application for peak shaving, load following or base load service, emergency back-up and uninterruptible power supply, prime mover applications (e.g., pump, air conditioning) and automotive hybrid vehicles.

The invention is not limited to the specific embodiment disclosed above. Instead, the present invention is construed according to the claims that follows.

What is claimed is:

1. A method of purging fuel from one or more fuel injector nozzles in the combustor of a gas turbine engine during shutdown of said engine, said engine including a compressor having a discharge and a pneumatic accumulator for storing compressed air, said method comprising the steps of:

(a) bleeding air from said discharge of said compressor during operation of said turbine;

(b) storing said bleed air in said accumulator;

(c) interrupting the flow of fuel being delivered to said combustor;

(d) communicating said accumulator with said fuel injector nozzles after said combustion in said combustion chamber has ceased, to enable said stored air to purge residual fuel from said fuel injector nozzles without creating an overspeed condition; and (f) providing a time delay, based on a predetermined value, between said step of interrupting and said step of purging, to insure that combustion in said combustor has ceased.

2. The method of claim 1, wherein said time delay is determined by determining when a preselected temperature drop has occurred.

3. The method of claim 1, wherein said time delay is determined by determining when a preselected period of time has lapsed after said step of interrupting.

4. The method of claim 1, wherein said engine includes a recuperator and further including the step of heating said air from said discharge with said recuperator prior to said air entering said combustor.

5. In combination with a recuperated gas turbine engine having a combustor with one or more fuel injector nozzles, a compressor for compressing gas to an elevated pressure, a compressor discharge conduit for delivering pressurized gas to said combustor, and a recuperator for heating said pressurized gas prior to entry into said combustor;

(a) a fuel delivery system including a source of pressurized fuel;

(b) means, when actuated, for interrupting fuel flow to said combustor;

(c) a gas accumulator operably connected to said compressor discharge conduit for accumulating and storing gas;

(d) means for providing communication between said accumulator and said fuel injector nozzles;

(e) a control valve, operably disposed in said means for communicating, for selectively blocking or allowing gas flow from said accumulator to said fuel nozzles;

(f) means for opening said control valve; and (g) means for determining when, after said means for interrupting has been actuated, a predetermined value has been reached, said predetermined value being an indication that combustion in said combustor has ceased, said means for determining being coupled to said means for opening said control valve.

6. The combination as set forth in claim 5, wherein said means for opening said control valve includes a controller, said controller also controlling said means for interrupting.

7. The combination as set forth in claim 6, wherein said means for determining when said predetermined value has been reached is a temperature sensor.

8. The combination as set forth in claim 6, wherein said means for determining when said predetermined value has been reached is a timer.

9. The combination as set forth in claim 6, wherein said means for determining when said predetermined value has been reached is an algorithm, said algorithm incorporated into said controller.

10. The combination as set forth in claim 2, wherein said combustor includes a catalyst capable of combusting fuel-air mixtures in a specified temperature range.

11. The combination as set forth in claim 5, wherein said engine is a variable speed engine.

12. A fuel injector nozzle purge system adapted for use with a turbine engine, said turbine engine having a combustor, a fuel delivery system including means, when actuated, for interrupting fuel flow to said combustor, said turbine engine also having means for developing pressurized gas flow to said combustor in relation to the speed of operation of said turbine engine, said combustor having one or more nozzles, said purge system comprising:

(a) a accumulator adapted to communicate with said gas flow pressurizing means, whereby gas is stored in said accumulator;

(b) means adapted to communicate said accumulator with said fuel injection nozzles;

(c) control valve means, operably disposed in said communicating means, for selectively prohibiting or allowing gas flow from said accumulator to said injector nozzles;

(d) control means for opening said control valve; and (e) means for determining when, after said means for interrupting has been actuated, a predetermined value has been reached, said predetermined value being an indication that combustion in said combustor has ceased, said means for determining adapted to be coupled to said means for opening said control valve.

13. The system of claim 12, wherein said means for determining when said predetermined value has been reached is selected from the group including a temperature sensor, a timer and an algorithm.

14. The system of claim 12, wherein said means adapted to communicate said accumulator with said fuel injection nozzles is selected from the group including one or more pipes, one or more flexible metal couplings, and one or more temperature-resistant hoses.

* * * * *

UNITED STATES PATENT AND TRADEMARK OFFICE
CERTIFICATE OF CORRECTION

| | |
|---|---|
| PATENT NO. | : 6,244,034 B1 |
| DATED | : June 12, 2001 |
| INVENTOR(S) | : Colin Taylor et al. |

Page 1 of 1

It is certified that error appears in the above-identified patent and that said Letters Patent is hereby corrected as shown below:

<u>Column 10,</u>
Line 8, "claim 2" should read -- claim 5 --.

Signed and Sealed this

Twenty-third Day of April, 2002

*Attest:*

JAMES E. ROGAN
*Attesting Officer*     *Director of the United States Patent and Trademark Office*